(12) United States Patent
Maxwell et al.

(10) Patent No.: US 7,962,845 B2
(45) Date of Patent: Jun. 14, 2011

(54) METHOD AND APPARATUS FOR POPULATING A FORM WITH DATA

(75) Inventors: Duane Maxwell, Coronado, CA (US); William Von Reis, San Diego, CA (US); Geoffrey D. Scott, San Diego, CA (US)

(73) Assignee: AOL Inc., Dulles, VA (US)

( * ) Notice: Subject to any disclaimer, the term of this patent is extended or adjusted under 35 U.S.C. 154(b) by 1051 days.

(21) Appl. No.: 11/413,680

(22) Filed: Apr. 28, 2006

(65) Prior Publication Data
US 2006/0206801 A1 Sep. 14, 2006

Related U.S. Application Data

(60) Division of application No. 10/426,182, filed on Apr. 29, 2003, now Pat. No. 7,062,706, which is a continuation of application No. 09/430,535, filed on Oct. 29, 1999, now Pat. No. 6,589,290.

(51) Int. Cl.
*G06N 3/00* (2006.01)
(52) U.S. Cl. ........................................ 715/224; 715/226
(58) Field of Classification Search .................. 715/221, 715/224, 225, 226, 769; 382/209
See application file for complete search history.

(56) References Cited

U.S. PATENT DOCUMENTS

| | | | | |
|---|---|---|---|---|
| 5,394,487 A * | 2/1995 | Burger et al. | .................. | 382/209 |
| 5,640,577 A | 6/1997 | Scharmer | ...................... | 715/507 |
| 5,794,259 A | 8/1998 | Kikinis | ......................... | 715/507 |
| 5,799,115 A | 8/1998 | Asano et al. | .................. | 382/305 |
| 5,909,678 A * | 6/1999 | Bergman et al. | ...................... | 1/1 |
| 5,974,430 A | 10/1999 | Mutschler et al. | ............ | 707/505 |
| 6,088,700 A * | 7/2000 | Larsen et al. | .................... | 707/10 |
| 6,192,380 B1 | 2/2001 | Light et al. | .................... | 707/505 |
| 6,199,079 B1 | 3/2001 | Gupta et al. | ................... | 707/707 |
| 6,247,029 B1 | 6/2001 | Kelley et al. | .................. | 707/507 |
| 6,272,467 B1 * | 8/2001 | Durand et al. | .................... | 705/1 |
| 6,363,479 B1 * | 3/2002 | Godfrey et al. | ............... | 713/160 |
| 6,421,693 B1 | 7/2002 | Nishiyama et al. | ........... | 707/507 |
| 6,499,042 B1 | 12/2002 | Markus | ......................... | 715/507 |
| 6,589,290 B1 | 7/2003 | Maxwell et al. | .............. | 715/507 |

FOREIGN PATENT DOCUMENTS

| | | | |
|---|---|---|---|
| EP | 0 918 424 A | 5/1999 | |
| WO | WO 9946701 A | 9/1999 | |

* cited by examiner

*Primary Examiner* — Kyle R Stork
(74) *Attorney, Agent, or Firm* — Finnegan, Henderson, Farabow, Garrett & Dunner, LLP

(57) ABSTRACT

A method and apparatus for populating a form with data is described. In one embodiment of the invention, a form is displayed to the user via the target application. Each form has one or more data receptacles. The data receptacles of a form are filled with data when the user executes a data population command. The form completion program executes the data population command when a graphical representation of a particular data set is placed over the form. Each data set is stored in an encrypted manner and is accessible to users who enter the appropriate information into an authentication mechanism. To populate a form with data the form completion program obtains an image of the form and then searches for a template file that resembles the form image to within a certain threshold. The template files are typically stored on the computer hosting the target application in a template directory that is arranged according to a predefined structure. The form completion program is configured to search for templates that resemble the form image in the template directory to within a certain threshold.

48 Claims, 10 Drawing Sheets

METHOD AND APPARATUS FOR POPULATING A FORM WITH DATA

CROSS-REFERENCE TO RELATED APPLICATIONS

This application is a divisional patent application of pending U.S. patent application Ser. No. 10/426,182, filed Apr. 29, 2003, which is a continuation of U.S. patent application Ser. No. 09/430,535, filed Oct. 29, 1999, issued as U.S. Pat. No. 6,589,290 on Jul. 8, 2003; the specifications and drawings of all of which are herein incorporated by reference in their entirety.

BACKGROUND OF THE INVENTION

1. Field of the Invention

The present invention relates to computer networks and more particularly to a method and apparatus for populating a form with data.

2. Background Art

Computer users can shop for merchandise using the Internet. A number of companies maintain web sites where customers can purchase books, records, videos, and many other products. Other web sites provide subscription services that provide the user with access to a service or product. Typically, users make purchases or sign up for services by completing forms. A problem with current Internet schemes is that each field on a form must be filled out separately and manually. This is a time consuming and often frustrating process for the user.

Current systems do not provide a way for users to quickly complete a form (referred to as "populating" a form) with data. For example, when a user wishes to purchase a product online, the user typically supplies a credit card number, a shipping address, and any other personal information that may be needed to complete the transaction. The user supplies this information using an input device such as a keyboard to manually enter data into the fields of a form. However, after buying goods from one vendor, for example, the user may wish to purchase goods from a second vendor. The user must manually complete the second vendor's form even though the second vendor may require the purchaser to provide the same kind of information the user provided to the first vendor. This presents a problem to the user because it forces the user to manually enter the same information into different vendor's forms multiple times.

Another problem presented by the prior art is that users do not have a way to securely store sensitive information and then later use that information to populate a form. Current systems do not provide a way to prevent unauthorized users from obtaining access to sensitive information stored on a user's computer. Instead such systems leave data that is entered into a form readily accessible. For example, data that is entered into a form may be stored locally using a technology called cookies. A cookie is a local representation of information related to a particular web page that was previously visited by the user. Cookies are not encrypted and may be read by anyone who can obtain them. The term anyone also includes any computer program that knows where the cookies are stored. This is problematic because it unnecessarily exposes sensitive information to unauthorized users. Therefore, there is a need for a method and apparatus for populating forms with data where that data is accessible only to authenticated users.

The problems associated with form population may be better understood by the following discussion of the Internet/World Wide Web, web page creation, embedded forms, cookies, and web browser technology.

The Internet/World Wide Web:

A web browser is a type of computer program that provides users with a mechanism for accessing the World Wide Web (WWW). The WWW is a segment of the Internet comprised of numerous web clients and web servers that communicate with one another using a standard set of protocols. A web server is a computer configured to provide web pages to the web client upon request. A web client typically utilizes the web browser application to request web pages from the web server.

The Internet is a global computer network comprised of an amalgamation of interconnected networks that are capable of readily communicating with one another using a standardized set of protocols. Protocols provide a uniform set of communication parameters that enable computers to effectively transmit and receive data. Most computer networks, including the Internet, utilize several different layers of protocols. Each layer provides the network with different functionality.

The WWW is a segment of the Internet that utilizes an application layer protocol called the HyperText Transfer Protocol (HTTP) to disseminate and to obtain information from users. HTTP is a request/response protocol used with distributed, collaborative, hypermedia information systems. In operation, HTTP enables one computer to communicate with another. For example referring now to FIG. 1, web client 100 can use HTTP to communicate with web server 150 via network 125. In this scenario the web server acts as a repository for files 160 and is capable of processing the web client's requests for such files. The files 160 stored on the web server may contain any type of data. For example, the files may contain data used to construct a form, image data, text data, or any other type of data.

HTTP has communication methods that allow web client 100 to request or send data to web server 150. The web client 100 may use web browser 110 to initiate request 115 and receive one or more files from file repository 160. Typically, web browser 110 sends a request 115 for at least one file to web server 150 and the web server forwards the requested file to web client 100 in response 120. The connection is then terminated between web client 100 and web server 150. Web client 100 then uses web browser 110 to display the requested file. A client request 115 therefore, consists of establishing a connection between the web client and the web server using network 125, issuing a response 120 to the request 115, and terminating the connection.

Web server 150 does not utilize state information about the request once the connection is terminated. HTTP is, therefore, a stateless application protocol. That is, a web client can send several requests to a web server, but each individual request is treated independent of any other request. In some instances, the web server maintains a record of such requests, but the web server does not use that information to process later requests. Thus, for example, if a form is completed by the user and submitted to the web server for processing, the web server may maintain a record of the data entered into the form, but that record will not be used to later influence another request from the same client. In other words, web server 150 may record a request in a log file, but it does not later read from the log to determine how to respond to another request from the same client.

Once a file is sent from web server 150 to web client 100 it becomes ready for display. The web client's 100 web browser 110 is typically used to format and display files. Web browser 110 allows the user to request and view a file without having to learn a complicated command syntax. Examples of several widely used web browsers include Netscape Navigator, Internet Explorer, and Opera. Some web browsers can display several different types of files. For example, files written using the HyperText Markup Language (HTML), the JavaScript programming language, the ActiveX programming language, or the Portable Document Format (PDF) may be displayed using a web browser. It is also possible to display various other types of files using language such as Standard Generalized Markup Language (SGML) or eXtensible Markup Language (XML).

Creating a Web Page:

A form, which provides one or more places for a user to enter data, can be embedded inside of a web page. A web page may be created using a variety of different data formats and/or programming languages. Most web pages, and as a result most forms, are created using the HyperText Markup Language (HTML). The techniques used to create a web page will now be discussed in further detail.

HTML is a language that may be used to specify the contents of a web page (e.g. web page 220). An HTML description is typically comprised of a set of markup symbols which are described in more detail below. HTML file 250 or any type of data file that contains the markup symbols for web page 220 may be sent to web browser 210. Web browser 210 executing at web client 200 parses the markup symbols in HTML file 250 and produces web page 220, which is then displayed, based on the information in HTML file 250. Web page 220 may contain text, pictures, or forms comprised of embedded text fields, checkboxes, or other types of data that is to be displayed on the web client using web browser 210. Consequently, HTML document 250 defines the web page 220 that is rendered by web browser 210. For example, the following set of markup symbols directs web browser 210 to display a title, a heading, and an image called "image.jpg":

```
<HTML>
<HEAD>
<TITLE> This is a document title </TITLE>
</HEAD>
<BODY>
<H1> This text uses heading level one </H1>
<IMG SRC="http://www.idealab.com/image.jpg">
</BODY>
</HTML>
```

In the above example, markup symbols (e.g. "<" and ">") indicate where each HTML command (e.g. TITLE) begins and ends. An HTML command, which is typically surround by markup symbols, provides the web browser with instructions to execute. Markup symbols typically surround an HTML command. The "<" symbol indicates the start of an HTML command an the "</" symbol indicates the end of an HTML command. Each start or end command has a corresponding ">" to indicate the close of that particular command. Information associated with the HTML command may be contained within the HTML command's start and end symbols. An HTML command is used by the web browser 210 to determine how to process the block of information associated with the two commands.

In the above example, "<TITLE>", and "</TITLE>" are examples of HTML commands surrounded by markup symbols. The "</TITLE>" HTML command directs web browser 210 to place the text "This is a document title" in the title bar of web browser 210.

Some HTML commands have attribute names associated with the command. For example, HTML command "<IMG>", directs web browser 210 to display an image. A "SRC=" attribute identifies the location and name of the image to be displayed. In the above example, the statement "<IMG SRC="http://www.idealab.com/image.jpg">" tells the web browser to display an image named "image.jpg" that can be obtained from the web server located at "http://www.idealab.com."

Embedding a Form into a Web Page

An HTML file may also contain HTML commands that cause the web browser to render a web page that contains fields for entering data. The portion of the web page that contains the data entry fields may be referred to as a form (e.g. the portion enclosed in the HTML tags <FORM> </FORM>). When the web page is comprised of primarily data entry fields the entire web page is sometimes also referred to as a form. As is discussed below, HTML includes an HTML form command that may cause the browser to display data entry fields. A text box, a drop down menu, a check box, a command button, a toggle button, or any other kind of interface component capable of receiving input are some examples of the type of data entry fields that may be placed in a form. Data is manually entered into the fields by the user and then submitted to a web server for processing. As previously discussed, when a user wishes to use a form to purchase a product, for example, the user manually fills in text boxes located on the form with the type of information needed to carry out the transaction. Other types of data entry fields require the user to select from one or more options such as in the case of a menu, a toggle button, or a radio button, for example. When the form is complete the user submits the completed form to the vendor's web server by pressing a command button, for example.

A problem with collecting information from the user in this manner is that the user is required to manually enter data into the fields of a form. This takes time and becomes unnecessarily burdensome when the user wishes to complete more than one form with the same information.

FIG. 3 provides an example of, a form created using the HTML definition language. Code block 310 contains HTML command examples. When a document comprising code block 310 is transmitted to web browser 300 executing on web client 330, it causes form 305 to be displayed. Web browser 300 displays form 305 by parsing the HTML commands contained in code block 310 and then using the information obtained to format form 305. Once the user finishes entering information into form 305, the user may submit the form by pressing command button 331. Pressing command button 331 sends the information entered by the user in form 305 to web server 320 using the POST method. However, one of ordinary skill in the art could modify code block 310 to use the GET method instead of the POST method.

The <FORM> command shown in code block 310 indicates the beginning of a form. Once the initial FORM command is placed into the HTML document other HTML commands may be entered between the initial FORM command and the closing FORM command (e.g. </FORM>) that represent, for example, one or more data entry fields such as a text-box, drop-down lists, check boxes, radio buttons, and input buttons. The INPUT command is used to specify different types of data entry fields. The type of data entry field created is dependant upon the value assigned to the INPUT command's TYPE attribute. For example, the INPUT command can create a text-box, a password field, a hidden field, a button, a radio button, or a checkbox. A "text" value assigned to the TYPE attribute of an INPUT command creates a text box, for example. Similarly, a TYPE of "checkbox" creates a checkbox. The following code, if inserted after the FORM element, creates a text box and a checkbox:

```
<INPUT TYPE="text" NAME="user_name">
<INPUT TYPE="checkbox" NAME="user_item1">
```

The HTML tags and text contained in code block 310, for example, create form 305 when displayed using web browser 300.

A <FORM> tag may contain an ACTION and/or METHOD attribute. The ACTION attribute specifies what program on the server to execute when form 305 is submitted for processing. The METHOD attribute describes how data entered into the form is handled. There are two METHOD choices: GET and POST. Each one of them is capable of processing the data entered into a form. To illustrate, if a user named Bill who resides at 130 West Union Street, Pasadena, Calif. 91103 with a credit card number of 1111222233334444 completes the Name Address, and Credit Card number fields shown on form 305 by filling in spaces 345-347, then the following data string 350 is created and sent to web server 320.

```
user_name=Bill&user_address=130 West Union Street
Pasadena CA 91103&user_cc=1111222233334444
```

This data string may be handled by either the GET method or the POST method. However, in FIG. 3 it is handled by the POST method. The GET method appends information entered into form 305 by the user onto the end of a Uniform Resource Locator (URL 335) or in a QUERY_STRING environment variable. URL 335 is submitted to web server 320 by web client 330 in an HTTP request 315. Web server 320 is responsible for processing the submitted information. A problem with the GET method is that the information contained in URL 335 is not stored on web client 330 for later use and cannot therefore be later used to populate form 305. With the POST method, the information placed into form 305 by the user is placed into the data stream of the HTTP protocol. This allows web server 320 to process form 305 data using the standard input data stream to a separate program or script on the server. Standard input is a method for providing a program or script with data that is well know to programmers skilled in the art. The POST method also does not provide a way to store data on web client 330 for later use.

The ACTION attribute of the FORM tag indicates where the computer program tasked with processing data string 350 resides. For example, the following portion of code block 310 specifies that a computer program (e.g. a PERL script) named form_processor.pl is located in cgi-bin 321 of sever 320.

```
<FORM METHOD=POST ACTION=http://server320
/form_processor.pl>
```

The form_processor.pl program is responsible for processing data string 350. Programs that utilize the Common Gateway Interface (CGI) standard are typically located in a common directory (e.g. cgi-bin 321). CGI is a specified standard for communicating between HTTP servers and server-side gateway programs. A CGI program is capable of storing data supplied by the user, but it cannot determine whether the user asking for the form is the same user that previously submitted data to the CGI program. If the user has never visited the web site before, the CGI program does not have any information about that user. CGI programs can collect information about users who visit a web site, but such programs cannot collect information about users who have never visited the web site.

The program "form_processor.pl" used in the above example is an example of a server-side program that processes data input by the user via form 305, for example. When form 305 is submitted web server 320 executes the "form_processor.pl" program and passes the data that was entered by the user and then sent from web client 330 to server 321. That is, data string 350 is passed to "form_processor.pl" when a form is submitted. When the gateway program is done processing data string 350 the result is sent to server 320 and a response may be forwarded back to web client 330. Gateway programs can be compiled programs written in languages such as C or C++ or they can be executable scripts written using a scripting language such as PERL, TCL, or various other language. Once data string 350 is processed it may be stored on server 320 in data store 322. A problem with using CGI programs is that since they are located on the server, information cannot easily be saved on the web client for later use.

Thus, existing mechanisms for processing forms reside on the server and are unable to populate a form on the client with user data from users that have never visited the web site having the form (e.g. the data is only available to web servers the user has previously visited).

HTTP Cookies

One example of data that may be stored on the client is a cookie. A cookie is an HTTP header that consists of a text-only string. The text-string is entered into the memory of a web client and accessible by the web browser. This text-string is initially set by the computer serving the web page and consists of the domain name, path, lifetime, and value of a variable that the server sets. If the lifetime of this variable is longer than the time the user spends at that site, then the text-string is saved on the web client for later use. As a result, cookies provide a way to store and later recall values entered into a web page by the user. For example, cookies allow a web server to individually customize a web page for each user who visits the page.

A cookie may be used to populate the elements of a form that a user has previously completed. For example, referring now to FIG. 9, if a user completes field 945-947 of form 905 and submits it to server 920 via submission path 915, server 920 can place the data submitted by the user in cookie 931 by sending web client 910 data via path 925. If the user returns to form 905 again Web browser 930 executing at web client 910 may use the data saved in cookie 931 populate fields 945-947 with the data previously entered by the user. Thus, a cookie can free the user from having to complete form 905 more than once. Cookies can be used to fill forms the user has previously visited. However, the data that is stored by the cookie cannot be used to populate other forms. That is, a problem with cookies is that forms located on different servers are not provided access to the same cookie. Only web servers that are listed as having permission to access a particular cookie may obtain such access.

A cookie is only accessible to the server that set, or created it. Thus, a second form cannot use the first form's cookies to obtain the user's name and address. For example, the web server located at www.merchantA.com may be allowed to read a cookie, but the web server located at www.merchantB.com may not be allowed to read the cookie created by www.merchantA.com Referring now to FIG. 4, the process used to create and retrieve a cookie is illustrated. Initially, web browser 401 which resides on web client 400 issues a request 410 for web page 415 from web server 450. Web server 450 responds by sending a copy of web page 415 to web client 400 via response 411. Web client 400 uses web browser 401 to display web page 415 to the user. To create a cookie 460, web server 450 sends a "Set-Cookie" command in the header line contained in response 411. For example, in response to a request 410, web server 450 may send the following command in HTTP response 411:

---
Set-Cookie: NAME=VALUE; expires=DATE; path=PATH; domain=DOMAIN_NAME; secure.

---

The NAME and VALUE parameter contain the information included in the cookie. DATE is the time at which the cookie expires and is thus no longer saved on web client 210. DOMAIN is the host address or domain name for which the cookie is valid. For example, if a cookie is set by a computer having a domain name of www.merchantA.com, only the server responsible for that particular domain name is provided access to the cookie. The PATH parameter specifies a subset of URL's at the appropriate domain for which the cookie is valid. If the keyword secure is used then the cookie is only transmitted over a secure connection. All of these parameters except the NAME=VALUE are optional to set a cookie. Once the Set-Cookie command is sent to web client 400 a cookie 460 is placed on web client 400.

To create a cookie 460 using the UNIX operating system, for example, web server 450 could execute the following shell script in response to a request 410:

```
#!/bin/sh
echo Content-type: text/html
echo Set-cookie: FooBar=foo; expires=Wednesday,
    02-11-99 12:00:00 GMT
echo
echo <H1>A Cookie named Foobar containing the text
    foo is now present on your computer</H>
```

This script stores "FooBar=foo" on web client 400. The following script allows web server 450 to read the HTTP cookie:

```
#!/bin/sh
echo Content-type: text/html
echo
echo The data supplied here was obtained from a
    cookie:<P>
echo $HTTP_COOKIE
```

Once cookie 460 is created, the information stored in the cookie can be used in many different ways. Information in cookie 460 may be accessed by a script that has authorization to insert cookie 460 data into a form, for example. However, a problem with cookies that no authentication mechanism is required to obtain the information they store. A cookie is a text file and is not stored in encrypted form. While a browser may limit access to a cookie, the text that is stored in the cookie may be accessed or read by any program that can read a text file. Therefore, it is not wise to store any sensitive data in a cookie. An additional problem with cookies is that users do not have to enter a user name and password to obtain access to the cookie.

Predefined Paste Operation

Some web browsers provide users with a mechanism for pasting predefined data into a form. Under the generic preferences menu of the Opera web browser, for example, the user can select a command button labeled personal information. When this command button is selected a dialog box that contains fields for entering personal information opens. If the user desires, the user can enter a name, an address, a phone number, an e-mail address, and/or any other kind of information into the text fields of the dialog box.

Once the user enters information into the fields of the dialog box and clicks "OK" the information that was entered can be pasted into the fields of a form by performing a right click operation. For example, if the user encounters a form that has a place for entering an address, the user can elect to paste the address previously specified in the dialog box by first selecting the address field and then right-clicking on a pointing device such as a mouse and selecting from a drop down menu the item titled "insert address".

A problem with pasting information into the fields of a form in this manner is that the user is required to manually select the place to insert the information and the type of information to insert into that place. Another problem is that unauthorized users are not prevented from accessing the information entered into the dialog box.

SUMMARY OF THE INVENTION

A method and apparatus for populating a form with data is described. One embodiment of the present invention executes on a web client that is connected to a computer network such as the Internet. The web client is capable of obtaining web pages that contain forms from the Internet. The web client contains computer code, such as a form completion program, configured to enable a user to populate a form with data. The form completion program interacts with a target application (e.g. a web browser) installed at the web client to provide the user with a mechanism for filling out multiple forms. The form completion program, for example, provides the user with a mechanism to complete a form by dragging a graphical representation of a data set over to the form and then dropping it.

In one embodiment of the invention, a form is displayed to the user via the target application. Each form has one or more data receptacles. The data receptacles of a form are filled with data when the user executes a data population command. The form completion program executes the data population command when a graphical representation of a particular data set is placed over the form. The form completion program collects data from the user via a data collection interface. The data collection interface provides data entry fields for the user to enter a particular type of information (e.g. a data set). Each data set that is entered using the data collection interface is stored in an encrypted manner and is accessible to users who enter the appropriate information into an authentication mechanism.

To populate a form with data the form completion program obtains an image of the form and then searches for a template file that resembles the form image to within a certain threshold. The template files are typically stored on the computer hosting the target application in a template directory that is arranged according to a predefined structure. The form completion program is configured to search for templates that resemble the form image in the template directory to within a certain threshold. However, the invention also contemplates searching for templates at alternate locations. Templates, for example, may reside on any other computer that is accessible via a telecommunication medium such as a computer network.

The form completion program examines each template file in order to determine if one or more of the template files resembles the form image to within a certain threshold. If a template file that resembles the form image to within a certain threshold is located, then the form completion acknowledges that a match occurred. When a match occurs the form completion program utilizes the template file to identify what kind of data to insert into each of the form's data receptacles. For example, the template file allows the form completion program to determine which of the data receptacles contain personal information and which data receptacles contain payment information. Once the form completion program successfully identifies what kind of data to insert into each data receptacle the program begins to input the appropriate kind of data into the appropriate data receptacle.

The present invention contemplates the use of multiple techniques to insert information into the data receptacles. The technique used is largely dependent upon the type of target application used to display the form.

DETAILED DESCRIPTION

A method and apparatus for populating a form with data is described. In the following description numerous specific details are set forth in order to provide a more thorough understanding of the present invention. It will be apparent, however, to one skilled in the art, that the present invention may be practiced without these specific details. In other instances, well-known features have not been described in detail so as not to obscure the invention.

One embodiment of the present invention executes on a web client that is connected to a computer network such as the Internet. The web client is capable of obtaining forms from the Internet and contains computer code configured to allow a user to populate a form with data. In one embodiment of the invention, a form completion program is created to execute the invention.

Figure 10:
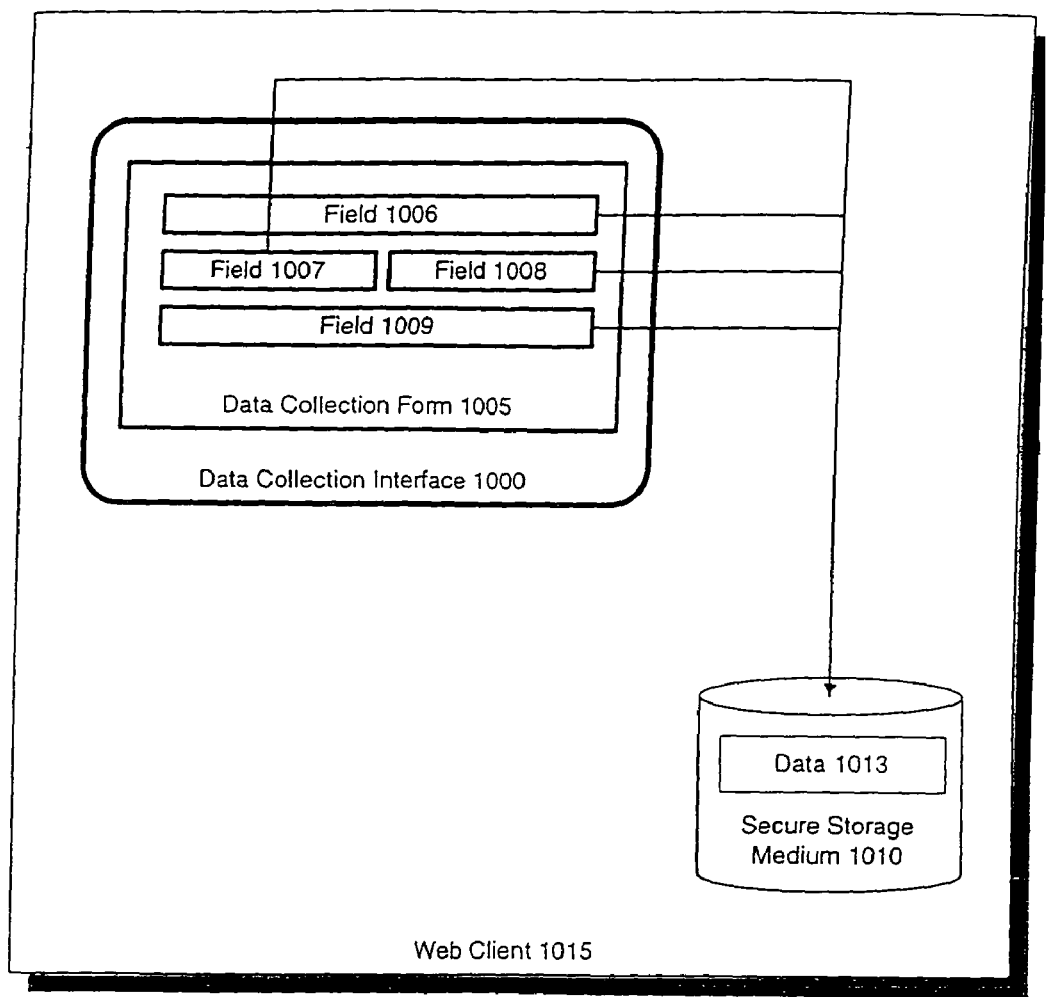
FIG. 10 is a block diagram illustrating how data is collected from the user in one embodiment of the invention.

The form completion program interacts with a target application (e.g. a web browser) installed at the web client to provide the user with a mechanism for filling out multiple forms. The target application displays forms to the user. The form completion program may have multiple interfaces that each provide the web client 1015 with additional functionality. For example, referring now to FIG. 10, a data collection interface 1000 is shown. The data collection interface 1000 may be used to collect and store multiple data sets from multiple users. A data set is a collection of related information (e.g. payment information or personal information) that represents any kind of information likely to be used to complete a form.

In one embodiment of the invention, the data collection interface collects a data set via a data collection form 1005. Data entered into the data collection fields 1006-1009 of the data collection form 1005 may be stored in secure storage medium 1010. The data stored in storage medium 1010 is utilized to populate a form when the user issues a form population command. The data held in secure storage medium 1010 may be encrypted and reside on web client 1015 and/or any other computational device available via a network communication medium. A user is not permitted to access secure storage medium 1010 until properly authenticated.

Figure 11:
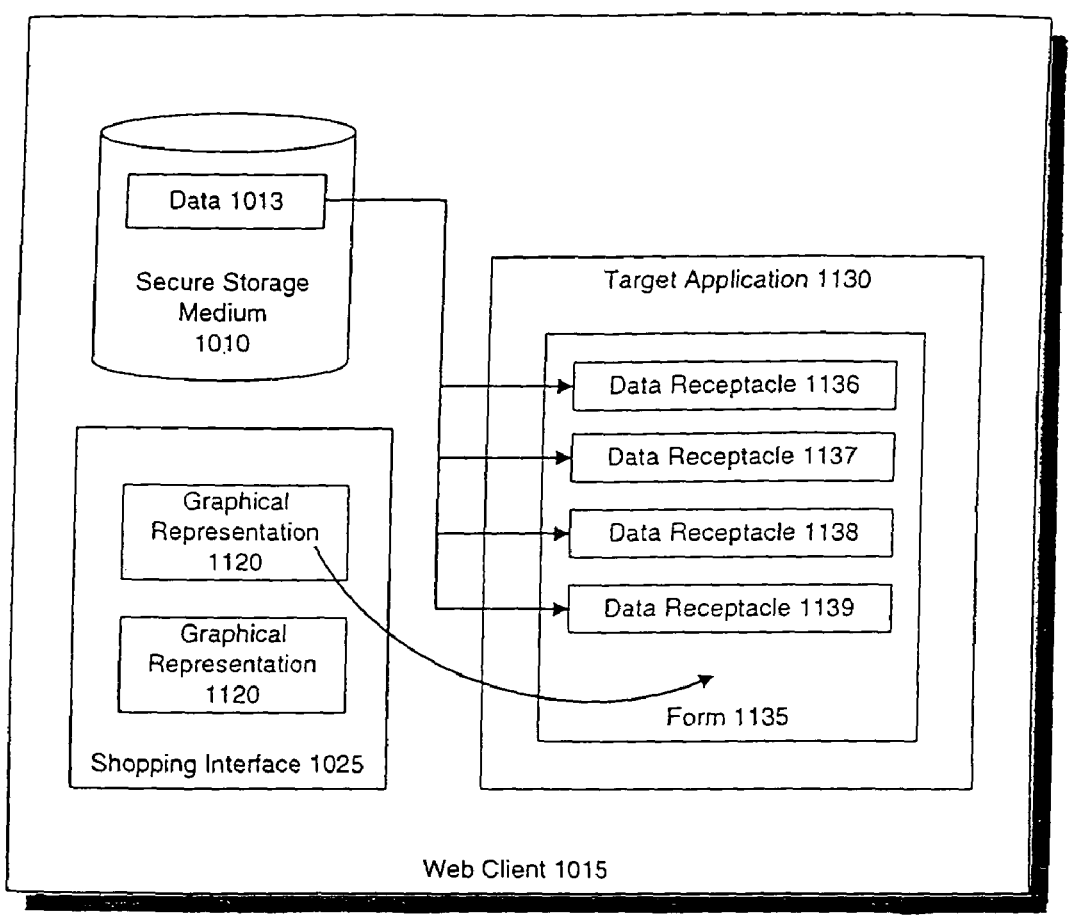
FIG. 11 is a block diagram illustrating how the shopping interface used by one embodiment of the invention interacts with a target application.

Each data set stored in secure storage medium 1020, may be associated with a graphical representation 1120. Referring now to FIG. 11, for example, a data set comprising payment information may be represented by a credit card graphic. A data set comprising personal information may be represented by an identification card graphic. A data set may be associated with any type of graphic. In one embodiment of the invention, the graphical representations of each data set are displayed to the user via a shopping interface 1125. The shopping interface may be used to execute a form population command. When executed, a form population command completes form 1135. Form 1135 is displayed via a target application 1103 such as a web browser or other computer program.

The form completion program executes the data population command when a graphical representation 1120 is moved from the shopping interface 1120 to form 1135. The data population command fills data receptacles 1136-1139 with data taken from secure storage medium 1010. For example, if the user encounters a form 1135 that prompts the user for personal information (e.g. name, address, and phone number), then the user could provide that information to form 1135 by dragging a graphic (e.g. graphic 1120) that represents the user's personal information from form completion program to form 1135. When the user drops the graphical representation 1120 of the information onto the form 1135, the data population command places data into the appropriate place of the form by obtain the data from secure storage medium 1010, identifying what type of form 1135 is to be populated, and then using this information to fill the fields 1136-1139 of form 1135 with data. In one embodiment of the invention, the type of form 1135 that is to be populated is identified by a template file. However, the manner with which a form is populated is dependent upon the type of form that is being populated.

The form completion program, for example, provides the user with a mechanism to complete a form by dragging a graphical representation of a data set over to the form and then dropping it. Anytime the user encounters a form the user may elect to populate the form by performing this drag and drop operation.

In one embodiment of the invention, the data receptacles of a form are filled with data when the user executes a data population command.

Creating a Form

A form may be created using HTML or any other programming language capable of generating a document that provides a place for the user to enter data (e.g. a data receptacle). For example, a spreadsheet, a word processing document, a document created using PDF, a database table, or any other type of document having one or more data receptacles may be referred to as a form. A data receptacle is a field or place for holding and/or receiving data.

Data Population Command

In one embodiment of the invention, the data population command is executed by a form completion program. The form completion program may be configured to collect data from the user and execute a data population command when the user performs a drag and drop operation. Other types of computer programs, however, may also collect data from the user and perform a data population command. For example, an operating system, a dynamic link library, a Java applet, or any other type of executable computer program may be configured to execute a data population command.

The form completion program aids in the process of collecting data from the user by prompting the user for information likely to be required to complete a form. For example, the user might be prompted to enter personal information (e.g. name, address, phone number, etc.) and payment information (e.g. American Express number, Visa card number, MasterCard number). Once information is gathered, the form completion program creates a graphic that is representative of the type of information collected. For example, if the user provides the form completion program with payment information such as a Visa Card or MasterCard number, then a graphic is created that represents the form of payment information the user supplied. For example, an icon depicting a Visa Card, MasterCard or other such card might be displayed. If the user provides personal information, such as a name and address, then a graphic is created that identifies the data associated with that particular personal information. For example, an image resembling a drivers license or identification card might be displayed. Each graphical representation that is created is associated with a different data set. The user may elect to create additional data sets that have a corresponding graphical representation. The user may customize the type of data set collected and the graphics associated with that data set. A graphic may represent any kind of data. The form completion program utilizes the information the user supplies (e.g. the data set) to populate a form. For example, when a graphic that is representative of a particular type of data is dragged from the form completion program and dropped on a form the data population command is executed, and the form is completed without requiring more input from the user.

When the user executes the data population command, data is placed inside the data receptacles of the form on which the user executed the data population command. Multiple data sets/graphics may be used to populate the same form. For example, a graphic representative of a credit card may be used to populate the form with credit card data and a graphic representative of a user's personal information may be used to populate the form with personal information.

Various types of data may be placed into each data receptacle. For example, executing a data population command may insert text data, image data, and/or any other type of data into one or more data receptacles. In one embodiment of the invention, the data utilized to populate the form is supplied by the user and stored on the user's computer before execution of the data population command. However, it is possible to obtain data from other sources. For example, the data population command may obtain data from a memory device that is available via a communication medium such as a computer network. The user executes a data population command by moving a graphical representation of the data from a first location to a second location.

Figure 1:
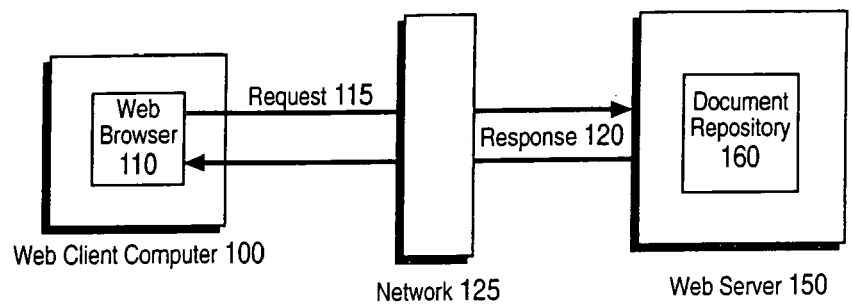
FIG. 1 is a block diagram of the various components used by the World Wide Web.
Figure 2:
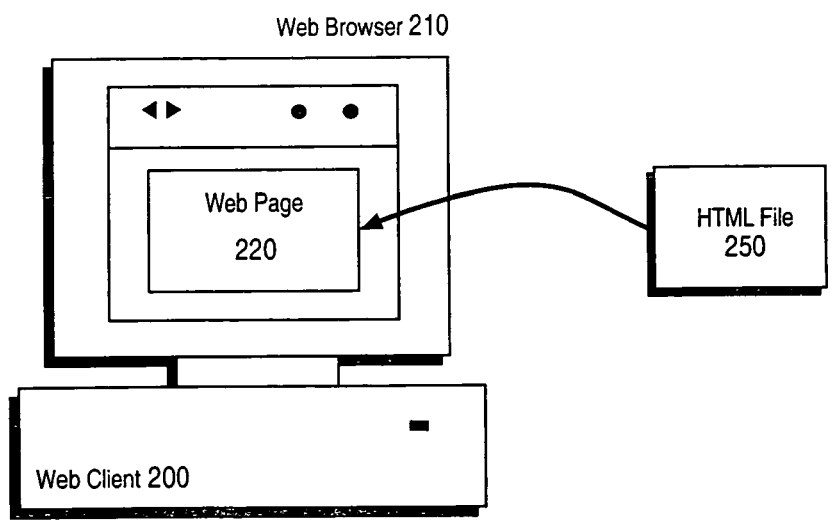
FIG. 2 is a block diagram illustrating the components used to create a web page.
Figure 3:
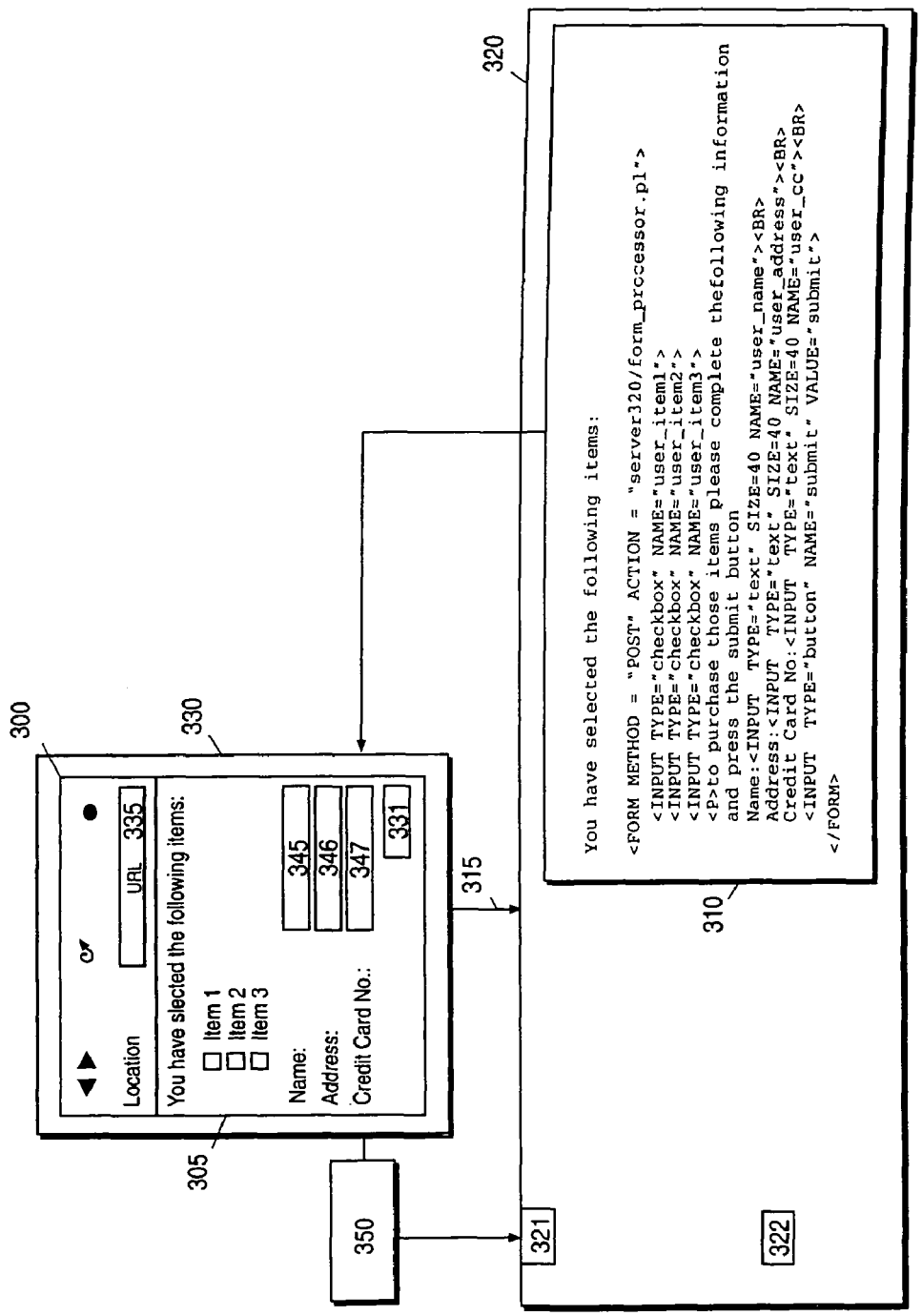
FIG. 3 is a block diagram illustrating how web client interacts with a web server to display a form.
Figure 4:
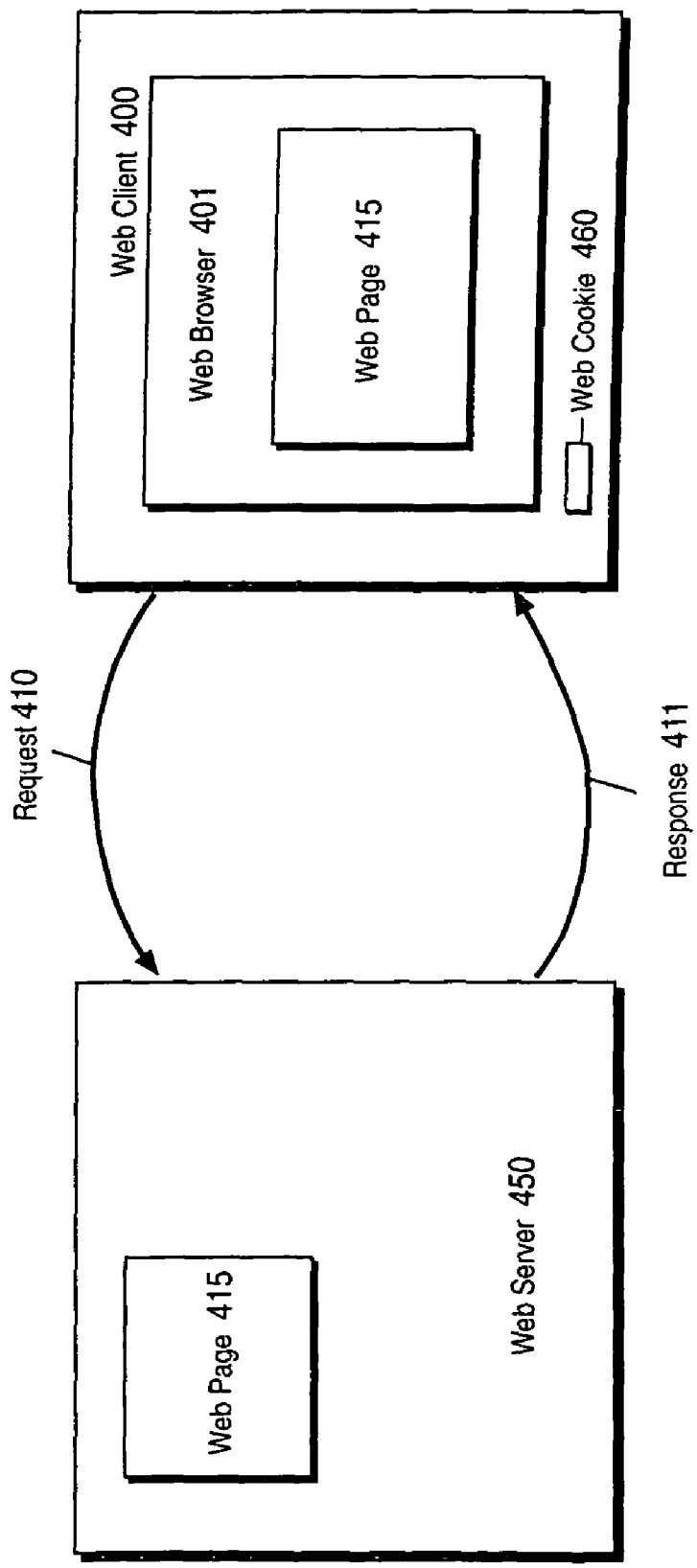
FIG. 4 illustrates the process used to create and retrieve a cookie.
Figure 5:
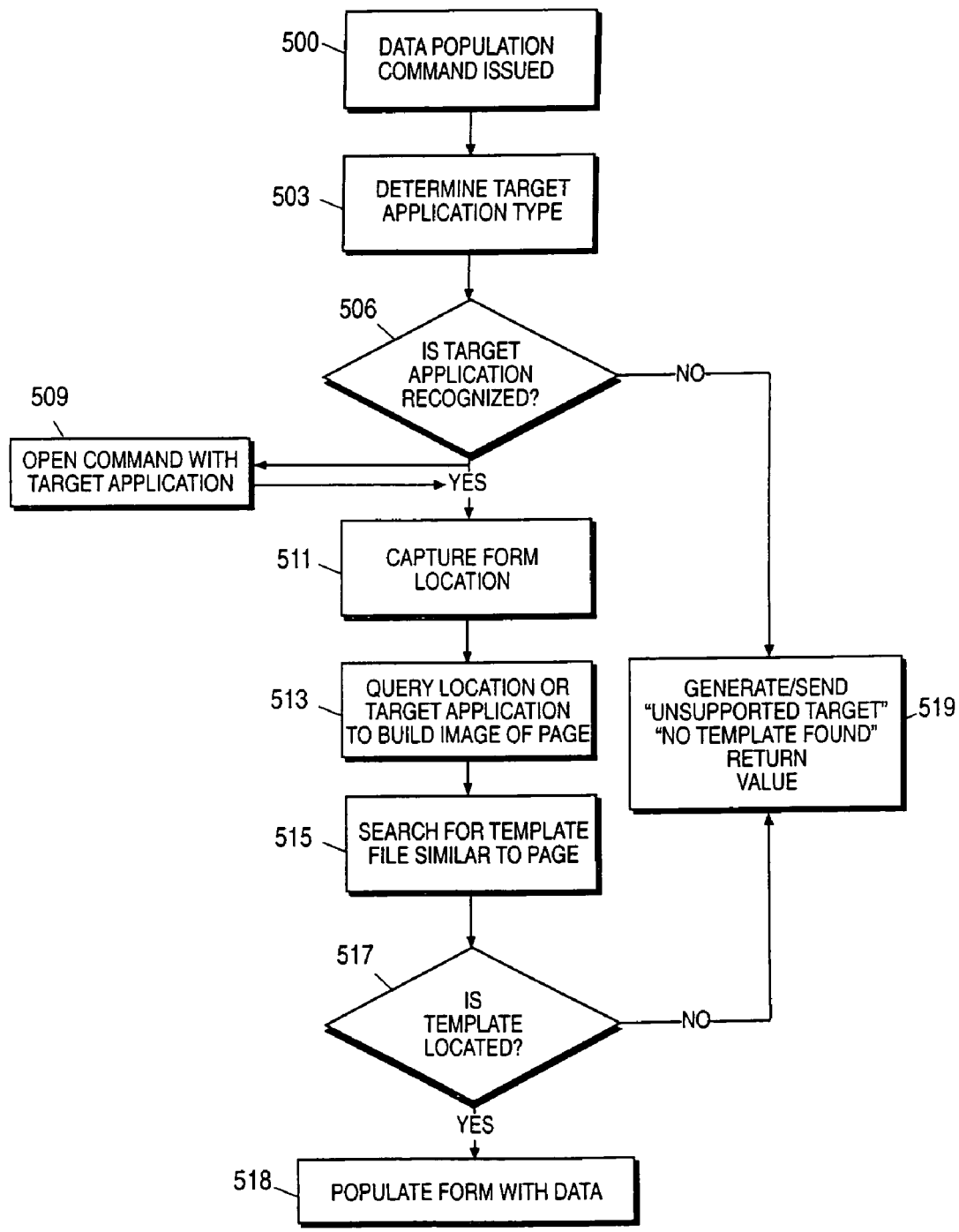
FIG. 5 is an illustration of the process used by one embodiment of the invention to populate a form.

Referring now to FIG. 5, an illustration of the process used by one embodiment of the invention to populate a form is shown. The user initiates a data population command at step 500 by performing a drag and drop operation. Once the user issues a data population command the form completion program proceeds to step 503 where an attempt is made to determine what type of target application is displaying the form that is to be populated. For example, the form completion program may determine that the user is attempting to populate a form displayed using the Internet Explorer web browser. The type of application displaying the form to the user is referred to as the target application.

When the target application type (e.g. Internet Explorer) is determined, then the form completion program proceeds to step 506. At step 506, the form completion program determines whether it recognizes the target application. The form completion program may be configured to support a variety of different target applications.

If the target application is recognized the form completion program proceeds to step 509 where it begins to communicate with the target application in a manner understood by the target application. If the target application is not recognized, then a return value is sent, at step 519, and the form completion program informs the user that this type of target application is not yet supported. At step 509, the form completion program is configured to interact with different target applications using a variety of different communication techniques. A form displayed using Internet Explorer may be dealt with in a different way than a form displayed using Netscape Communicator (e.g. a different interface protocol may be used). The COM interface, for example, is used to communicate with Internet Explorer 4. However, the present invention also contemplates the use of other interfaces and API's such as ActiveX or Javascript. The type of protocol utilized by the form completion program is dictated by the target application. The present invention contemplates the use of a protocol capable of communicating with the target application. It is possible to utilize a variety of different protocols to open a communication channel between the form completion program and the target application.

Once step 509 is complete, the communication channel between the form completion program and the target application is open. This allows the form completion program to proceed to step 511 where it captures the location of the form. For example, if the form is displayed using a web browser, the form completion program will capture the Uniform Resource Locator (URL) that identifies where the form is located. The URL provides the form completion program with the address information needed to determine where the form being populated was obtained. For example, the URL may indicate that the user obtained the form from another computer accessible via a communication medium such as a network. At step 513, the form completion program builds an image of the form the target application displays to the user. In one embodiment of the invention, the form completion program builds the form image by querying the computer (e.g. the server) that originally supplied the form to the target application. However, the form completion program may build a form image by querying any computer that has a version of the form that is displayed to the user. For example, the form image could be built by contacting a mirror server instead of the original server. The form completion program may also build the form image by querying the target application about its form properties or the form completion program may elect to utilize a local version of the form that is displayed to the user. For example, the form completion program may utilize a cached version of the form to build a form image. The present invention contemplates various techniques for building a form image. It is possible to utilize any version of the form the user is attempting to populate in order to build the form image.

Once an image of the form the user is attempting to populate is produced, the form completion program proceeds to step 515 where it searches for a template file that resembles the form image. The template file comprises a collection of form descriptions. In one aspect of the invention, the template file is a text file that contains one or more form descriptions. Each form description is typically associated with a particular form. However, one description may represent multiple forms if the forms are substantially similar to one another. Each form description in the template file is associated with a regular expression and a list of controls. Each control has an index, a symbol, and a control type description.

The index associates a number with each control that resides on a form. For example, if a form contains a button control and a select box control the template file may identify information about each of these controls by associating the number zero with the button control and the number one with the select box control. The template file may also contain a plain text name for each control. In one embodiment of the invention, each control is associated with a symbol. The symbol represents the data that is to be placed inside the fields of the form. For example, the symbol can represent a name, date, or gender. Each control also has a control type description that identifies what type of control is present. The control type description, for example, may be utilized by the form completion program to determine what steps are required to populate the control with data. The way a text box is filled, for example, may be different from the way a check box is completed. A text box may accept raw textual data whereas a check box may accept a Boolean value.

In one embodiment of the invention, each form in the template file has a regular expression associated with it. The regular expression describes a set of one or more forms that a particular template file resembles (e.g. by using a string of text, such as a URL, that is contained within a form) and thereby provides information that may be used to perform a string matching operation. String matching provides the form completion program with a way to determine whether the template file resembles a form to within a certain threshold. For example, if the URL of a form contains a word that starts with W followed by a period and three more letters, this information can be stored in the regular expression and used to verify that the correct template file is being used to complete the form.

If the form completion program attempts to complete a form that is not represented in the template file, a list of the data that was collected from the user is displayed. When the list is displayed, the user may elect to manually intervene by dragging information from the list onto the form. If, for example, the user wishes to place address information into one of the data receptacles contained on a form, the user can drag the address data from the list to the form. At this point, the information placed over the form is inserted into the appropriate data receptacle. The user may repeat this process to fill-in the remaining data receptacles. In one embodiment of the invention, the actions of the user may be used to generate a form description. For example, if a user manually completes a form, the form completion program may track the information the user elected to place in the forms various data receptacles. This information may then be transmitted to a third party for verification and utilized to generate a new form description for the template file. In one embodiment of the invention, a different template file is created for each form. However, a single template file may represent more than one form. For example, a generic template that operates on forms that adhere to a set of predefined standards may be created and later verified by an independent party. The template may store information using a variety of formats such as binary, hexadecimal, or text (e.g. ASCII or XML). It is also possible to use other methods for representing information. A template file, for example, may be an executable file, a compressed file, and/or any other form of storing digital information. For example, a template file may be included in the form (using ECML, inband tems).

The template files are typically stored on the computer hosting the target application in a template directory. The form completion program is configured to search for templates that resemble the form image in the template directory to within a certain threshold. However, the invention also contemplates searching for templates at alternate locations. Templates, for example, may reside on any other computer that is accessible via a telecommunication medium such as a computer network.

The form completion program examines each template file in order to determine if one or more of the template files resembles the form image to within a certain threshold. For example, if a percentage of the template file is similar to the form image then the form completion program may assume that a match occurred. In one embodiment of the invention, the threshold percentage is thirty percent. However, the present invention contemplates the use of any percentage indicative of a match. For example, in some instances a threshold percentage lower than thirty percent indicates a match whereas in other instances a percentage greater than thirty percent indicates a match. The percentage chosen is largely a result of how much the form has changed since the template file was created. If, for example, a form has added new graphics, but has substantially the same text as when the template was created, then the template file will resemble the form image to a greater percent than it would if the text or number of data receptacles on the form were changed.

If a template file that resembles the form image to within a certain threshold is located, then the form completion program proceeds to step 517 where it acknowledges that a match occurred. If no match is found the form completion program informs the user that the data population command was not successfully completed. At this point the program may execute step 519 and exit. Otherwise, the form completion program executes step 518 where the information obtained from the template file is utilized to populate the form.

The form completion program utilizes the template file to identify what kind of data to insert into each of the form's data receptacles. For example, the template file allows the form completion program to determine which of the data receptacles contain personal information and which data receptacles contain payment information. Once the form completion program successfully identifies what kind of data to insert into each data receptacle the program begins to input the appropriate kind of data into the appropriate data receptacle. The user's name, for example, is placed in all data receptacles that expect such information and the user's credit card number is placed in all data receptacles that expect credit card information.

The present invention contemplates the use of multiple techniques to insert information into the data receptacles. The technique used is largely dependent upon the type of target application used to display the form. If, for example, the form is displayed using the Internet Explorer web browser the form completion program populates the data receptacles by sending a command to the browser that tells the browser which string belongs in which data receptacle (e.g. insert name into data receptacle 1). If the form is displayed with the Netscape web browser, the technique for inserting information into the data receptacles differs. When Netscape is used, data is inserted by grabbing standard input and emulating keystrokes. Each keystroke inserts a character of information into the appropriate data receptacle. To move from one data receptacle to the next the set focus system message is sent (WM_SETFOCUS). However, the invention contemplates using other methods such as emulating the tab key. Once information is properly inserted into the appropriate data receptacles, the data population command is complete.

The Form Completion Program:

In one embodiment of the invention, the form completion program uses a registry with the operating system (OS) to assure proper execution. The registry contains multiple fields. Each field contains information that may be utilized by the form completion program during execution. An example of the kind of fields that may be placed in the registry follows.

| Field Name | Description |
| --- | --- |
| InstallPath | Contains the path of installed program |
| UpdateFile | Contains the name and path to copy to be deleted |
| LastUser | Contains the name of last user |
| Coordinate X | Contains the horizontal coordinate (in pixel), of the program window |
| Coordinate Y | Contains the vertical coordinate (in pixel), of the program window |
| Server URL | Contains URL(s) where update routine should check for a new version of the program |

When the form completion program is installed, a directory structure is created that contains files used by the form completion program during execution. This directory contains the form completion program and two sub-directories: "user" and "data". The "user" sub-directory contains as many sub-directories as there are users. Each sub-directory contains one file called by the login name of the user, followed by the extension ".dat". This file contains encrypted data about the user (e.g. address, credit card information, electronic money, etc.). The "data" sub-directory contains general information utilized by the form completion program during execution. For example, graphical images that represent various kinds of data, web site information, and other information useful to the form completion program is placed in the "data" sub-directory. The information placed in the "data" sub-directory is organized in a tree of one or more additional sub-directories.

The "domain" sub-directory, for example, is located within the "data" sub-directory. In one embodiment of the invention, the "domain" sub-directory contains a database of information that is used by the form completion program to populate a form. For example, the database may contain a list of web sites (e.g. domain names) having forms that can be populated. Template files associated with each domain name are also placed in the database.

The database contains sub-directories listing each of the top-level domain names (e.g. .com, .net, .org, etc. . . . ). Each sub-directory of top-level domain names contains a tree of sub-directories organized in alphabetical order. When the form completion program initially launches, a startup routine begins to execute. The startup routine performs a number of checks to ensure that the program is running properly. The form completion program then launches a separate process, called a thread, to determine if the form completion program that is running is the most current version available. The process determines if the program is current by contacting a server. The server responds by transmitting an update signal to the form completion program that indicates whether or not the program is indeed out of date. If the form completion program is out of date, the program starts the download-update process.

After running the start-up checks the form completion program enters a listening mode. While in listening mode the program listens for any action that occurs within the display space of the form completion program, or hot keys. For example, the program listens for actions received from the operating system (e.g. mouse pointer selection, keyboard key stroke, voice commands, etc. . . . ). These actions are handled by the application action listener which generates commands according to an action-to-command map.

Figure 6:
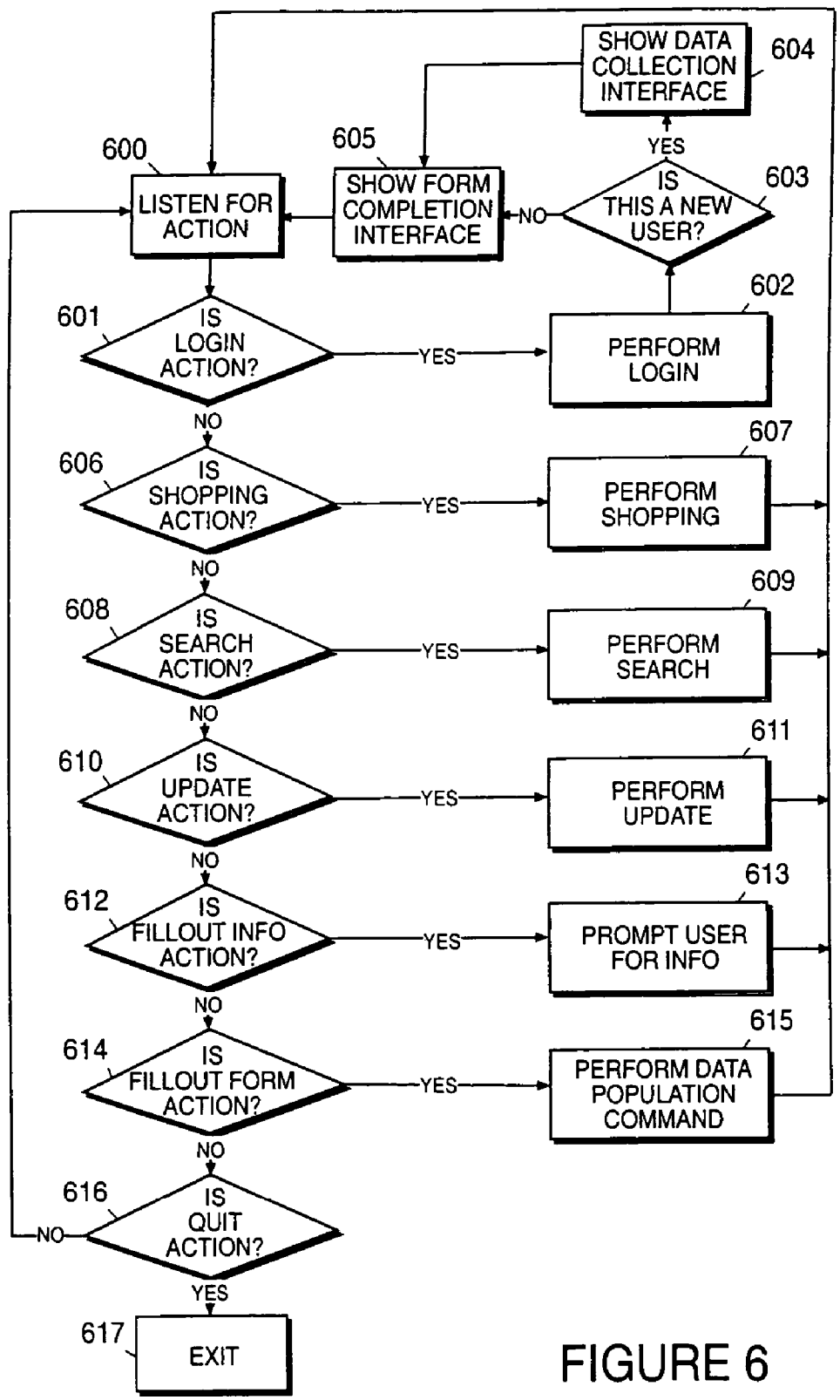
FIG. 6 illustrates some of the actions the form completion program listens for when it is in the listening mode.

FIG. 6 illustrates some of the actions the form completion program listens for when it is in the listening mode. When an action is triggered that is bound to a command (e.g. those being listened for), the form completion program runs the segment of code responsible for performing the corresponding action. If, for example, the form completion program is in listening mode 600 and the user initiates a login action 601, then the program performs a login operation 602. In one embodiment of the invention, the login operation ensures that users are properly authenticated before being allowed access to sensitive data. For example, users are not permitted to access personal information such as a credit card number without first being authenticated. A user is authenticated when the user enters the correct login and password information.

However, in one embodiment of the invention, the user's password information is not stored by the form completion program. To determine if the user's login and password information is correct, the form completion program determines if the user has logged in before by examining whether a directory having the name entered by the user as a login parameter exists. If the user has not previously logged in, the user is asked to provide a login name and a password. If the user has previously logged in (e.g. the user's directory exists), then the program generates a 32-bit number using a CRC Algorithm. A random number key is generated using the CRC output as a seed. If the correct random number is generated, the user is authenticated. At this point, the user is permitted to access the user's sensitive data. This technique is beneficial because it enables the form completion program to authenticate a user without having to permanently store the user's password information. The present invention also contemplates the use of various authentication schemes that are known in the art and is not limited to the process discussed herein.

In one embodiment of the invention, after the login operation is performed the form completion program proceeds to step 603 where it determines if the user is a new user. If the user is new, the form completion program advances to step 604 where it shows the user a data collection interface. Once the user enters data into the data collection interface, the program executes step 605 where it displays a shopping view to the user. The shopping view is comprised of one or more graphical representations of the user's sensitive information.

It is possible for other types of actions to transpire while the form completion program is in listening mode. For example, the user might wish to perform a shopping action 606. When a shopping action 606 occurs the form completion program performs a shopping operation 607. In one embodiment of the invention, a shopping action occurs when the user selects an image indicative of a particular shopping destination. For example, if the form completion program displays a list of web sites to the user, a shopping action 606 occurs when the user selects one of the web sites on the list. When the user initiates the shopping action 606 it causes the form completion program to perform step 607 where a web browser window is displayed to the user containing the web page the user selected from the list.

When a search action 608 occurs, the form completion program performs a search 609. For example, in one embodiment of the invention the form completion program contains a location for the user to enter a search query and a way to identify a preferred search engine. If the user enters a search query and submits the query a search 609 is performed. The form completion program responds by passing the search parameter entered by the user to the preferred search engine identified by the user. The results of the search are displayed inside of a web browser window that runs external to the form completion program.

If an update action 610 occurs, the form completion program performs an update 611. During an update operation 611 the form completion program checks to see if the version of the program currently executing is the most recent version available. In one embodiment of the invention, the update operation 611 queries a server via a network to determine the latest available version is. If the form completion program currently executing is in need of a version update, the program starts an update thread to handle the update process. When the execution of the update process is complete, the form completion program running is the most recent version. The update operation 611, for example, may be utilized to add functionality to the form completion program.

The form completion program may be configured to listen for actions other than the ones identified in FIG. 6. For example, the user may customize the program to listen for a specific type of action. The present invention also contemplates action added by the update operation 611.

When a FillOut Information action 612 is performed the form completion program executes step 613. At step 613, the user is prompted for information. In one embodiment of the invention, the user is shown a data collection interface that provides locations for the user to enter a particular type of information. For example, the user may be prompted for personal information, payment information, and/or any other type of information deemed necessary to populate a form. This information may be associated with an image file, text file, multimedia file, or other representation of the data entered into the data collection interface.

If a FillOut Form action 614 occurs, the form completion program executes a data population command 615. The data population command 615 provides the user with a mechanism for populating a form. When the user elects to stop running the form completion program, a quit action 616 occurs. When a quit action 616 executes the form completion program returns to an inactive state.

Figure 7:
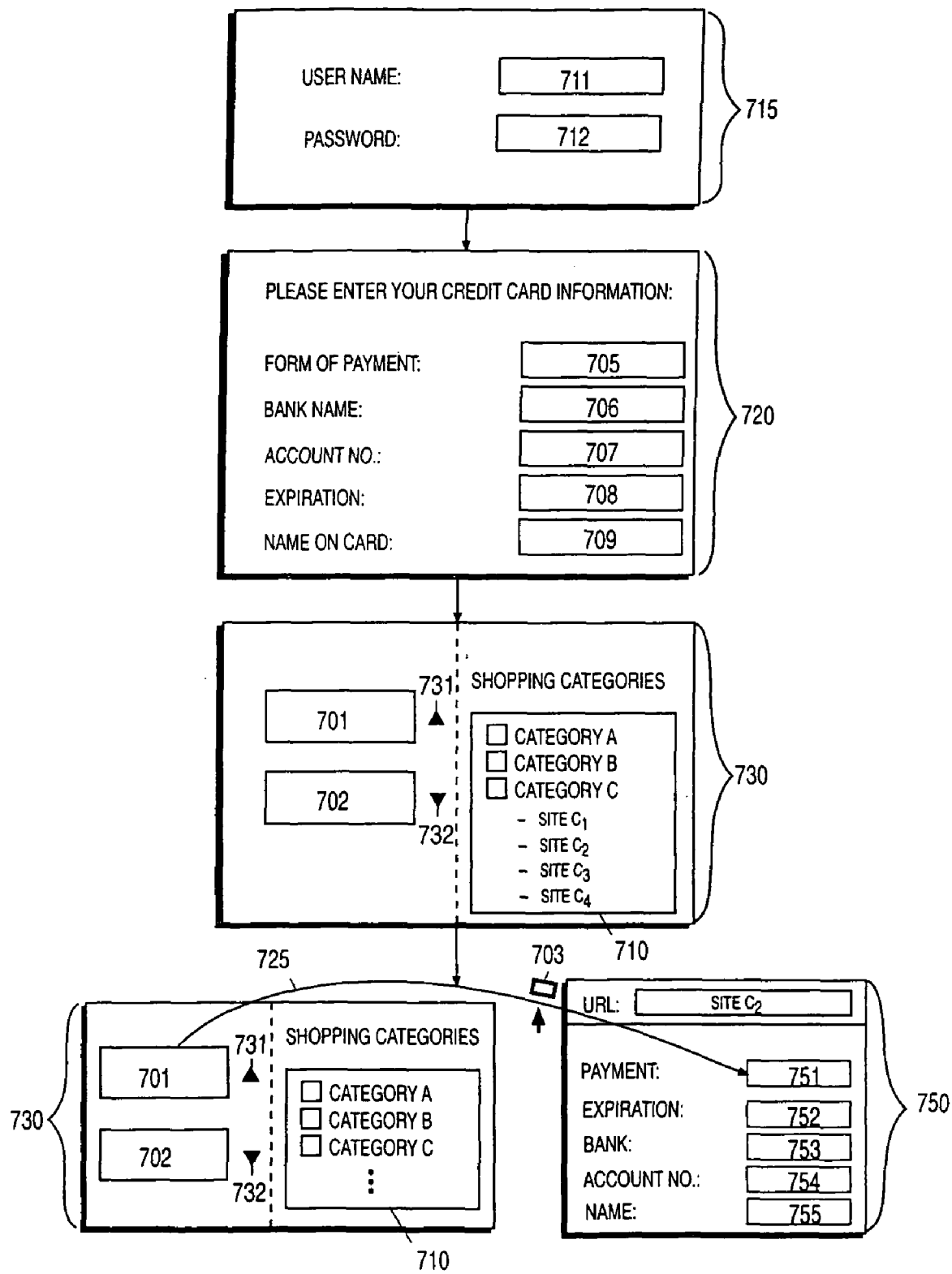
FIG. 7 is an example of several of the interfaces presented to the user by the form completion program.

Referring now to FIG. 7, an example of several of the interfaces presented to the user by the form completion program is shown. When the user initially opens the form completion program, a login interface 715 is displayed which provides the user with locations for a user name 711 and password 712. In one embodiment of the invention, a login action 601 occurs when the user enters the appropriate information into the login interface 715 and presses the return key.

If the user is properly authenticated the form completion program displays a data collection interface 720. The data collection interface 720 contains one or more fields 705-709 for entering data. When the user enters data into these fields 705-709 the data is stored for later use during a form population command. There are several different types of data collection interfaces 720. Each type is used to obtain a different data set from the user. For example, the user is presented one interface for entering payment information and another interface for entering personal information.

If, for example, the data collection interface 720 intended for collecting payment information is displayed, the user is provided with one or more fields 705-709 for entering data. Each field is intended to store a different type of information. For example, field 705 is used to collect the form of payment (e.g. American Express) the user wishes to utilize for later populating a form. Fields 706-709 provides a place for the user to enter information related to the form of payment identified. The name of the issuing bank is entered into field 706. The account number of the identified card is entered into field 707 and the expiration date and name on the card are entered into fields 708 and 709.

Once the user enters such information into fields 705-709 it is stored by the form completion program for later use. In one embodiment of the invention, the data collected via the data collection interface is stored on the computer having the form completion program in encrypted form and protected from unauthorized users by an authentication mechanism. For example, data about a particular user may be stored in a directory bearing the user's login name. Before access is granted to the information in that directory the user is prompted for a name and password. If the appropriate user name and password is entered, then access is granted to the specified user's data. When the correct information is not entered access is denied. This permits multiple users to make use of the form completion program and prevents unauthorized users from inappropriately obtaining access to another users data.

In one embodiment of the invention, each collection of data entered into the data collection interface 720 is associated with a representation of that data. The representation may be in the form of image data, text data, multimedia data, and/or any other kind of data. For example, if data collection interface 720 prompts the user for payment information, a graphic representing that payment information (e.g. a Visa Card graphic) will be displayed to the user.

For example, the shopping interface 730 displays numerous representations 701-702 of each data set entered by the user via the data collection interface 720. Each representation 701-702 may represent a different data set. For example, representation 701 might represent a form of payment whereas representation 702 might represent a user's personal information. Additional representations may be displayed when the user scrolls either up or down using command buttons 731 and 732.

In one embodiment of the invention, a portion of the shopping interface 730 is dedicated to displaying a list 710 of web sites where the user can purchase goods and/or services. This list 710 can be changed and modified by the update action 610. The list 710 may be organized in any manner preferred by the user. In one embodiment of the invention, the list 710 is divided into categories. When the user selects a link to a particular web site from list 710, the form completion program passes the URL information identified by the users action to a web browser program. The browser program, for example, accesses the web site identified in the URL to obtain the web page identified in the URL. If after perusing through the web site the user needs to complete a form to purchase an item, the user may use the form completion program to populate the form.

To illustrate, when the user encounters a form (e.g. after shopping), the user may elect to populate the data receptacles 751-755 of that form with the information associated with a particular representative graphic. If, for example, the user wishes to fill-out form 750 with payment information, the user may cause a data population command to execute by utilizing a pointing device to drag representation 701 along path 725 until the pointing device resides over form 750. When the pointing device is located over form 750 the data population command executes. The data population command causes data receptacles 751-755 to fill with data.

In one embodiment of the invention, the user is not required to drag representation 701 over to form 750, but can instead drag an iconosized version of representation 701 to form 750 in order to initiate a data population command. The iconosized version of representation 701 is a smaller image of graphical representation 701 that requires less processor overhead to rapidly move about the display region. The invention also contemplates the use of other mechanisms to initiate a data population command. The form completion program can, for example, be configured to perform a data population command whenever the user performs an event that discernibly indicates the user wishes to populate a form (e.g. a click event or a menu event).

Embodiment of Computer Execution Environment (Hardware)

Figure 8:
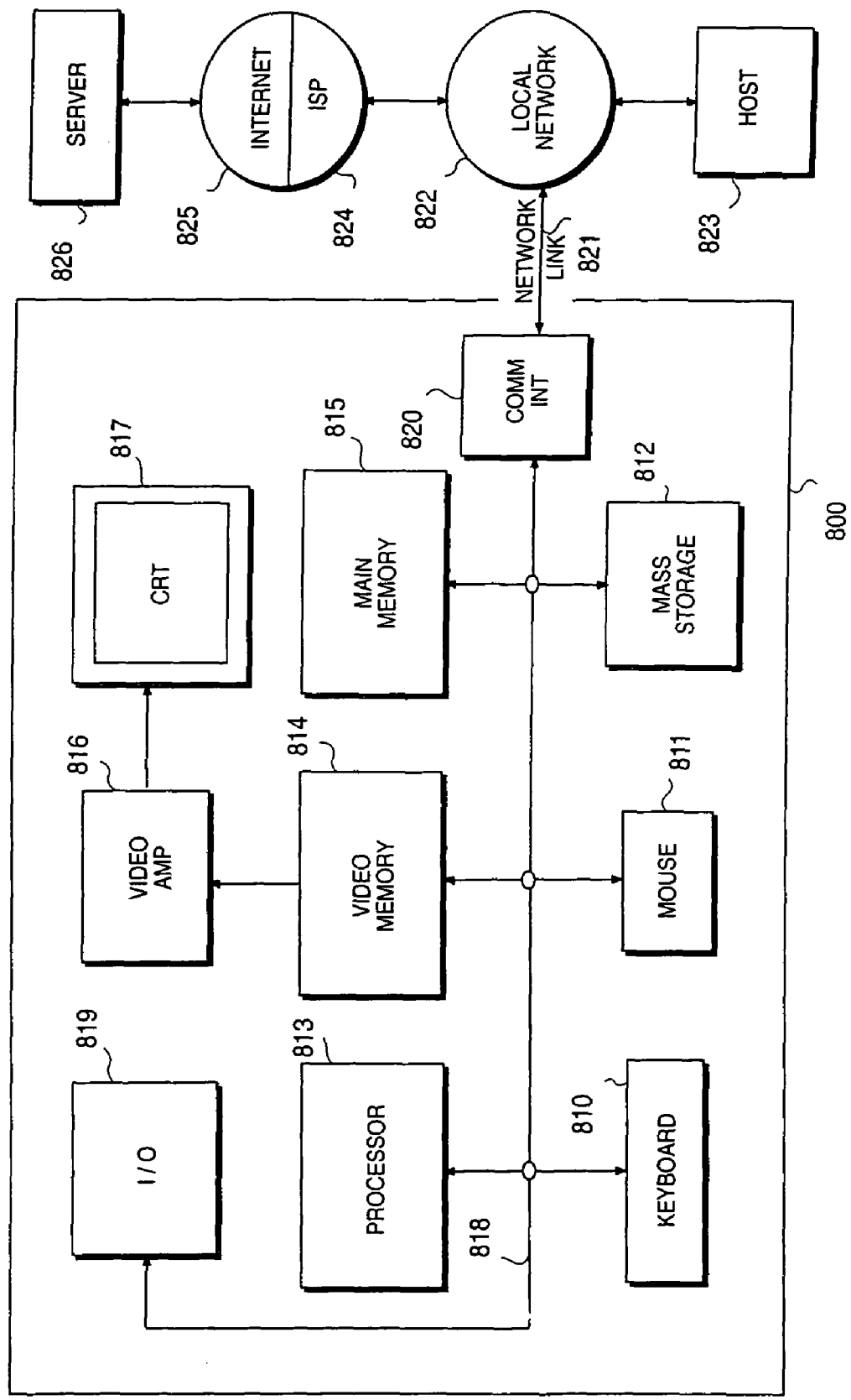
FIG. 8 illustrates the execution environment of one embodiment of the invention.
Figure 9:
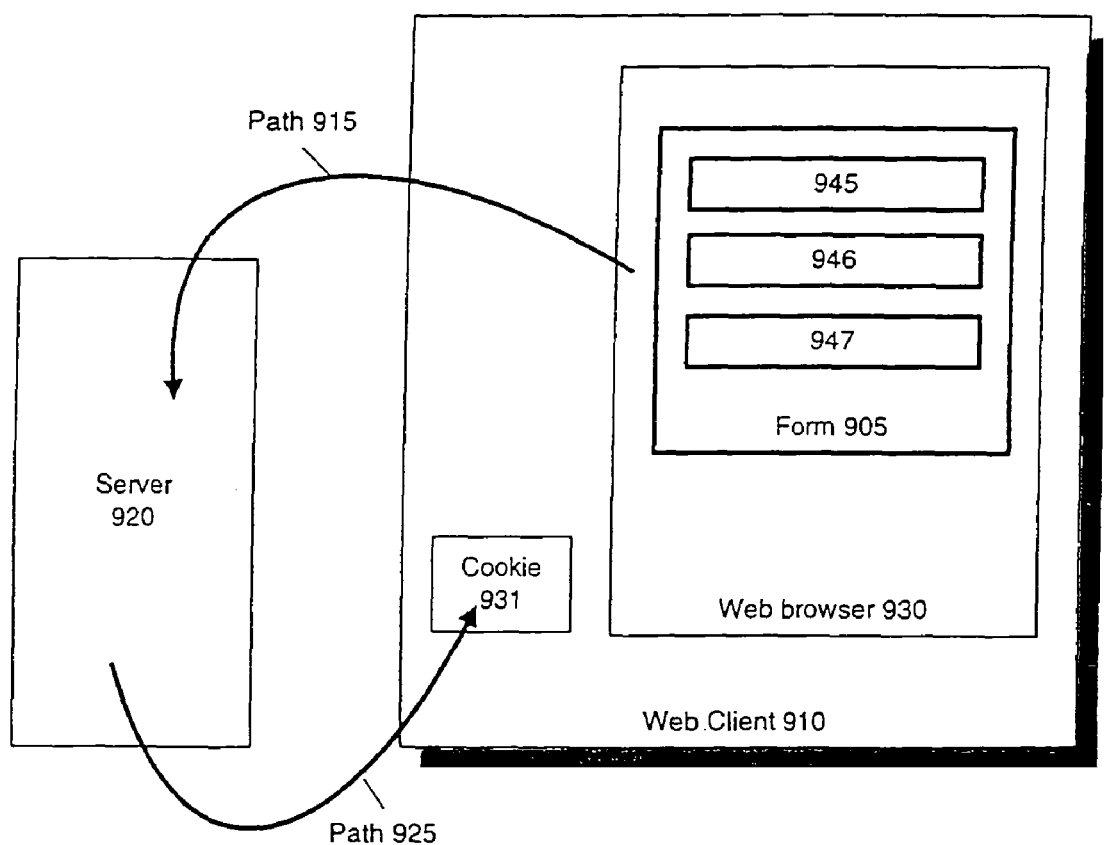
FIG. 9 illustrates the process used by cookies to save form data.

An embodiment of the invention can be implemented as computer software in the form of computer readable code executed on a general purpose computer such as computer 800 illustrated in FIG. 8, or in the form of bytecode class files executable within a Java™ runtime environment running on such a computer, or in the form of bytecodes running on a processor (or devices enabled to process bytecodes) existing in a distributed environment (e.g., one or more processors on a network). A keyboard 810 and mouse 811 are coupled to a system bus 818. The keyboard and mouse are for introducing user input to the computer system and communicating that user input to processor 813. Other suitable input devices may be used in addition to, or in place of, the mouse 811 and keyboard 810. I/O (input/output) unit 819 coupled to system bus 818 represents such I/O elements as a printer, A/V (audio/video) I/O, etc.

Computer 800 includes a video memory 814, main memory 815 and mass storage 814, all coupled to system bus 818 along with keyboard 810, mouse 811 and processor 813. The mass storage 814 may include both fixed and removable media, such as magnetic, optical or magnetic optical storage systems or any other available mass storage technology. Bus 818 may contain, for example, thirty-two address lines for addressing video memory 814 or main memory 815. The system bus 818 also includes, for example, a 64-bit data bus for transferring data between and among the components, such as processor 813, main memory 815, video memory 814 and mass storage 814. Alternatively, multiplex data/address lines may be used instead of separate data and address lines.

In one embodiment of the invention, the processor 813 is a microprocessor manufactured by Motorola, such as the 680X0 processor, or a microprocessor manufactured by Intel, such as the 80X86, or Pentium processor. However, any other suitable microprocessor or microcomputer may be utilized. Main memory 815 is comprised of dynamic random access memory (DRAM). Video memory 814 is a dual-ported video random access memory. One port of the video memory 814 is coupled to video amplifier 816. The video amplifier 816 is used to drive the cathode ray tube (CRT) raster monitor 817. Video amplifier 816 is well known in the art and may be implemented by any suitable apparatus. This circuitry converts pixel data stored in video memory 814 to a raster signal suitable for use by monitor 817. Monitor 817 is a type of monitor suitable for displaying graphic images.

Computer 800 may also include a communication interface 840 coupled to bus 818. Communication interface 840 provides a two-way data communication coupling via a network link 841 to a local network 844. For example, if communication interface 840 is an integrated services digital network (ISDN) card or a modem, communication interface 840 provides a data communication connection to the corresponding type of telephone line, which comprises part of network link 841. If communication interface 840 is a local area network (LAN) card, communication interface 840 provides a data communication connection via network link 841 to a compatible LAN. Wireless links are also possible. In any such implementation, communication interface 840 sends and receives electrical, electromagnetic or optical signals which carry digital data streams representing various types of information.

Network link 841 typically provides data communication through one or more networks to other data devices. For example, network link 841 may provide a connection through local network 844 to local server computer 843 or to data equipment operated by an Internet Service Provider (ISP) 844. ISP 844 in turn provides data communication services through the world wide packet data communication network now commonly referred to as the "Internet" 845. Local network 844 and Internet 845 both use electrical, electromagnetic or optical signals which carry digital data streams. The signals through the various networks and the signals on network link 841 and through communication interface 840, which carry the digital data to and from computer 800, are exemplary forms of carrier waves transporting the information.

Computer 800 can send messages and receive data, including program code, through the network(s), network link 841, and communication interface 840. In the Internet example, remote server computer 846 might transmit a requested code for an application program through Internet 845, ISP 844, local network 844 and communication interface 840.

The received code may be executed by processor 813 as it is received, and/or stored in mass storage 814, or other nonvolatile storage for later execution. In this manner, computer 800 may obtain application code in the form of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for populating forms is described.

The invention claimed is:

1. A method for populating an electronic form with data, comprising:
 obtaining at least one data set from a user;
 associating said at least one data set with a graphical representation;

obtaining a request to populate an electronic form having a plurality of data receptacles by executing a data population command for populating the form with the data set obtained from the user, in response to said user dragging the graphical representation onto the form;

generating an image of the form in response to the execution of the data population command;

identifying one or more data values from said at least one data set for one or more of said plurality of data receptacles, in response to the execution of the data population command, by identifying the type of the form based on a comparison between the generated image of the form and a corresponding template file; and populating said form by respectively inserting said one or more data values into one or more fields corresponding to one or more of said plurality of receptacles.

2. The method of claim 1, wherein obtaining said at least one data set from a user comprises displaying a graphical user interface to said user.

3. The method of claim 2, wherein obtaining said at least one data set further comprises obtaining at least one set of personal information.

4. The method of claim 3, wherein obtaining said at least one data set from said user further comprises obtaining at least one set of credit card information.

5. The method of claim 1, wherein said at least one data set is encrypted and stored.

6. The method of claim 5, wherein encrypting said at least one data set comprises encrypting said at least one data set using authentication information of said user.

7. The method of claim 1, wherein identifying said one or more data values comprises obtaining a source code of said form.

8. The method of claim 7, wherein obtaining said source code of said form comprises obtaining a Hypertext Markup Language source code.

9. The method of claim 7, wherein identifying said one or more data values further comprises parsing said form to obtain a set of fields corresponding to a set of data receptacles from said form.

10. The method of claim 1, wherein identifying said one or more data values comprises obtaining an identification of a source of said form.

11. The method of claim 10, wherein identifying said one or more data values further comprises traversing a directory tree to obtain a stored template.

12. The method of claim 11, wherein traversing said directory tree comprises obtaining a plurality of field identifications from said stored template.

13. The method of claim 12, wherein obtaining said plurality of field identifications comprises matching said field identifications with a plurality of fields in said form.

14. The method of claim 1, further comprising obtaining a plurality of field identifications from a plurality of fields input by said user.

15. The method of claim 14, wherein obtaining said plurality of field identifications comprises obtaining one or more matches between said plurality of fields in said form and said plurality of fields input by said user.

16. The method of claim 14, wherein obtaining said plurality of field identifications further comprises satisfying a matching threshold between said plurality of fields in said form and said corresponding plurality of fields input by said user.

17. The method of claim 1, wherein populating said form comprises invoking at least one command specific to a browser application.

18. The method of claim 17, wherein invoking said at least one command comprises passing said one or more data values to said browser application.

19. A non-transitory computer readable storage medium storing instructions which, when executed by at least one processor, cause the processor to:

obtain at least one data set from a user;

associate said at least one data set with a graphical representation;

obtain a request to populate an electronic form having a plurality of data receptacles by executing a data population command for populating the form with the data set obtained from the user, in response to said user dragging the graphical representation onto the form;

generate an image of the form in response to the execution of data population command;

identify one or more data values from said at least one data set for one or more of said plurality of data receptacles, in response to the execution of the data population command, by identifying the type of the form based on a comparison between the generated image of the form and a corresponding template file; and populate said form by respectively inserting said one or more data values in one or more fields corresponding to one or more of said plurality of data receptacles.

20. The computer readable storage medium of claim 19, wherein said computer readable program code configured to cause a computer to obtain said at least one data set from a user comprises computer readable program code configured to cause a computer to display a graphical user interface to said user.

21. The computer readable storage medium of claim 20, wherein said at least one data set comprises at least one set of personal information.

22. The computer readable storage medium of claim 21, wherein said at least one data set comprises at least one set of credit card information.

23. The computer readable storage medium of claim 19, wherein said at least one data set is encrypted and stored.

24. The computer readable storage medium of claim 23, wherein said computer readable program code configured to cause a computer to encrypt said at least one data set comprises computer readable program code configured to cause a computer to encrypt said at least one data set using authentication information of said user.

25. The computer readable storage medium of claim 19, wherein said computer readable program code configured to cause a computer to identify said one or more data values comprises computer readable program code configured to cause a computer to obtain a source code of said form.

26. The computer readable storage medium of claim 25, wherein said source code of said form comprises a Hypertext Markup Language source code.

27. The computer readable storage medium of claim 25, wherein said computer readable program code configured to cause a computer to identify said one or more data values further comprises computer readable program code configured to cause a computer to parse said form to obtain one or more fields corresponding to one or more of said plurality of data receptacles.

28. The computer readable storage medium of claim 19, wherein said computer readable program code configured to cause a computer to identify said one or more data values comprises computer readable program code configured to cause a computer to obtain an identification of a source of said form.

29. The computer readable storage medium of claim 28, wherein said computer readable program code configured to cause a computer to identify said one or more data values further comprises computer readable program code configured to cause a computer to traverse a directory tree to obtain a stored template.

30. The computer readable storage medium of claim 29, wherein said computer readable program code configured to cause a computer to traverse said directory tree comprises computer readable program code configured to cause a computer to obtain one or more field identifications from said stored template.

31. The computer readable storage medium of claim 30, wherein said computer readable program code configured to cause a computer to obtain said one or more field identifications comprises computer readable program code configured to cause a computer to match said one or more field identifications with one or more fields in said form.

32. The computer readable storage medium of claim 19, further comprising computer readable program code configured to cause a computer to obtain one or more field identifications from one or more corresponding fields input by said user.

33. The computer readable storage medium of claim 32, wherein said computer readable program code configured to cause a computer to obtain one or more field identifications comprises computer readable program code configured to cause a computer to obtain one or more matches between said one or more fields in said form and said one or more corresponding fields input by said user.

34. The computer readable storage medium of claim 33, wherein said computer readable program code configured to cause a computer to obtain said one or more field identifications further comprises computer readable program code configured to cause a computer to monitor satisfaction of a matching threshold between said one or more fields in said form and said one or more corresponding fields input by said user.

35. The computer readable storage medium of claim 19, wherein said computer readable program code configured to cause a computer to populate said form comprises computer readable program code configured to cause a computer to invoke at least one command specific to a browser application.

36. The computer readable storage medium of claim 35, wherein said computer readable program code configured to cause a computer to invoke said at least one command comprises computer readable program code configured to cause a computer to pass said one or more data values to said browser application.

37. A method for populating an electronic form with a data set, comprising:
associating a data set with a graphical icon, the data set comprising information corresponding to a user;
generating an image of a form after the graphical icon is positioned over the form, the form having a plurality of data receptacles;
identifying whether a first template file or second template file resembles the image of the form to within a matching threshold; and
populating the form with the data set associated with the graphical icon when the first template file matches the image of the form to within a matching threshold, or when the second template file matches the image of the form to within a matching threshold.

38. The method of claim 37, further comprising:
obtaining said at least one data set from a user by displaying a graphical user interface to said user.

39. The method of claim 38, wherein obtaining said at least one data set further comprises obtaining at least one set of personal information.

40. The method of claim 39, wherein obtaining said at least one data set from said user further comprises obtaining at least one set of payment information.

41. The method of claim 37, wherein said at least one data set is encrypted and stored.

42. The method of claim 41, wherein encrypting said at least one data set comprises encrypting said at least one data set using authentication information of said user.

43. The method of claim 37, wherein said first template file and said second template file are obtained by traversing a directory tree of stored template files.

44. The method of claim 43, wherein traversing said directory tree comprises obtaining a plurality of field identifications from said first template file and said second template file.

45. The method of claim 44, wherein obtaining said plurality of field identifications comprises matching said plurality of field identifications with the plurality of data receptacles in said form.

46. The method of claim 37, wherein populating said form comprises invoking at least one command specific to a browser application.

47. The method of claim 46, wherein invoking said at least one command comprises passing said one or more data values to said browser application.

48. A method for populating an electronic form with a data set, comprising:
obtaining at least one data set from a user;
associating said at least one data set with a graphical representation;
obtaining a request to populate an electronic form having a plurality of data receptacles by executing a data population command for populating the form with the data set obtained from the user, in response to said user dragging the graphical representation onto the form;
identifying one or more data values from said at least one data set for one or more of said plurality of data receptacles, in response to the execution of the data population command, by generating an image of a form after the graphical icon is positioned over the form;
identifying whether a template file resembles the image of the form to within a matching threshold; and
populating said form by respectively inserting said one or more data values into one or more fields corresponding to one or more of said plurality of receptacles when the template file matches the image of the form to within a matching threshold.

* * * * *